United States Patent
Feldman et al.

[15] 3,679,713
[45] July 25, 1972

[54] RECOVERY AND PURIFICATION OF BASIC TRIARYLMETHANE DYES

[72] Inventors: Martin Louis Feldman, East Brunswick; John Edson Gordon, Martinsville, both of N.J.

[73] Assignee: American Cyanamid Company, Stamford, Conn.

[22] Filed: Jan. 20, 1970

[21] Appl. No.: 4,413

[52] U.S. Cl. .............................. 260/388, 260/391, 260/393
[51] Int. Cl. ..................................................... C09b 11/14
[58] Field of Search ................................. 260/391, 393, 388

[56] References Cited

UNITED STATES PATENTS 1,878,530   9/1932   Kyrides................................260/393

*Primary Examiner*—Lorraine A. Weinberger
*Assistant Examiner*—L. Arnold Thaxton
*Attorney*—John L. Sullivan

[57] ABSTRACT

Basic triarylmethane dyes such as Malachite Green (C.I.42,000), Crystal Violet (C.I. 42,555) and Victoria Blue B (C.I. 44,045) are obtained in a purified or more concentrated condition from aqueous dispersions thereof by reacting the salt form of the dye with an inorganic base in the presence of a nonpolar solvent, thereby extracting the dye base into the solvent as it is formed, followed by separating the dye base solution from the aqueous phase and acidifying it to form the triarylmethane dye.

9 Claims, No Drawings

RECOVERY AND PURIFICATION OF BASIC TRIARYLMETHANE DYES

This invention relates to the recovery of basic triarylmethane dyes from aqueous dispersions containing them. More particularly, it relates to an improved process for obtaining these dyes in a more pure, more concentrated or other advantageously modified condition from their aqueous solutions, such as those in which they were prepared.

The triarylmethanes are one of the oldest and best known classes of dyes. The basic triarylmethane colors of commerce are free from sulfonic acid groups but contain alkylamino groups para to the methane carbon atom on at least two of their three aryl radicals. They therefore form dye salts with acids in which the chromophore is a cation, and these salts are water-soluble when the acid is itself soluble in water. The highly colored dye salts are converted into a water-insoluble and relatively colorless form when the acid is neutralized by adding an inorganic base; this condition is called the color base form of the dye. See "The Chemistry of Synthetic Dyes and Pigments" by H. A. Lubs (Reinhold, 1955), pages 273–4.

The principal subclasses of the basic triarylmethane dyes to be purified or concentrated by the process of the present invention are those outlined on pages 274–286 of this text. They are the diamino derivatives of triphenylmethane, of which Malachite Green (C.I. 42,000) and Brilliant Green (C.I. 42,040) are representative, the triaminotriphenylmethane dyes of which Crystal Violet (C.I. 42,555), Methyl Violet (C.I. 42,535), and Ethyl Violet (C.I. 42,606) are of greatest commercial importance, and the triamino-diphenylnaphthylmethanes such as Victoria Blue B (C.I. 44,045) and Victoria Pure Blue BO (C.I. 42,595), the formulas of which are shown on page 286 of the Lubs text.

These dyes are ordinarily prepared by manufacturing procedures in which the product is an aqueous solution of the salt form of the dye, usually the chloride or sulfate, which contains inorganic salts and other impurities formed in or accompanying its preparation. Purification has generally consisted in precipitating the color base by adding alkali, filtering, and, as is the case with Malachite Green, dissolving the precipitate in hot aqueous oxalic acid solution, and crystallizing the oxalate salt.

It has now been found that the separation of these dyes from impurities can be simplified by means of a selective solvent procedure. In accordance with this discovery an aqueous dispersion of the salt form of the dye is reacted with a quantity of an inorganic base sufficient to convert all of the dye into its color base form in the presence of a water-immiscible solvent for the color base that is liberated by the reaction. This produces a solution of the color base that is substantially free from the inorganic salts and other contaminants of the dye, and from which a purified dye can be precipitated or extracted by reacting the color base with an acid.

The process of the invention is preferably carried out in the following manner. A water solution of a basic triarylmethane dye in its water-soluble salt form is mixed with a nonpolar, water-immiscible organic solvent, and an inorganic base such as an alkali metal hydroxide or carbonate is added. The resulting mixture is heated if necessary, with stirring at a temperature well below its boiling point, such as at 40°–80°C., for several hours, or until all of the dye salt has been converted into dye color base. The hot mixture is then clarified by filtration if necessary, after which it is allowed to separate into two phases. The organic solvent phase, which contains all of the dye base but little or none of the inorganic salts and other impurities that may have accompanied the dye, is separated, heated and the dye base therein is recovered by reacting it with an acid.

The recovery step is preferably accomplished by slowly adding, with agitation, a dilute aqueous acid, such as hydrochloric or sulfuric acid. The mixture is then allowed to settle and the aqueous phase is drawn off and may be further treated to obtain the dye in the condition desired for packaging or use. Thus it can be concentrated to form a dye paste or spray dried to obtain the dye as a powder. The organic solvent may be recycled directly to the basifying step for use in another extraction.

The organic solvent used in this process is one that is water-immiscible in order to facilitate its ready separation from the aqueous phase. It must be a solvent for the color base form of the triarylmethane dye being treated but should not dissolve appreciable quantities of its salt form. The liquid nonpolar solvents are suitable for this purpose, representative solvents of this class being the mononuclear aromatic hydrocarbons such as benzene, lower alkylbenzenes including toluene, ethylbenzene, isopropylbenzene and the like and their monochlor derivatives, xylenes, mesitylene and other polyloweralkylbenzenes. Chlorobenzene, carbon tetrachloride and other similar chlorinated hydrocarbons can likewise be used. The selection of an appropriate water-immiscible solvent will be evident from these examples and from the requirements outlined above.

Any inorganic alkali can be used to liberate the color base form of the triarylmethane by combining with the anion of its dye. Water-soluble alkalies such as sodium or potassium hydroxide or carbonate are preferred, but other alkalies such as the alkaline earth metal hydroxides may be used. The alkali may be added as an aqueous solution or in solid form.

The alkali may be added to the extraction mixture in the form of an aqueous solution or as solid pellets. The aqueous solution may be of any concentration; the choice is mainly one of convenience. The amount of caustic used should be at least slightly in excess of the amount required to convert all of the cationic dye to its color base. The amount of excess alkali which may be used is unlimited, but for practical reasons, an excess of 20 to 30 percent is preferred. The caustic may be any inorganic base including potassium hydroxide, sodium hydroxide, sodium carbonate, and the like.

The order in which the organic solvent and the alkali are added to the aqueous triarylmethane dye solution is not of major importance, the critical factor being that the solvent must be present at the time when the alkali is reacted with the dye compound so that it can dissolve the dye base as it is liberated. This reaction usually takes place rather slowly, so there is ample time to add both materials in any order that may be desired.

As stated above, the organic solvent solutions of the cationic dye color bases are treated with acids to form the dye salts. The acids, which may be organic or inorganic, are preferably in the form of their aqueous solutions. If the dye salts formed are of limited solubility, the acidification is usually carried out with some warming. Upon treatment of the organic solvent solutions with the aqueous acids, the mixture is converted into two phases, one consisting of the organic solvent which is recycled for further use in another extraction and the other consisting of an aqueous solution of the cationic dye salt. The latter is spray dried or used as a liquid type if the dye salt is completely soluble; alternatively, if so desired and the dye salt crystallizes easily, the solution is cooled whereupon the dye crystals precipitate. In the second case, the filtrate remaining after the crystallized dye salt is removed can be used to prepare additional aqueous acid solution for acidification of another batch or color base, thereby avoiding any loss of the dye remaining in solution and circumventing carrying out recovery of the color base.

The amount of acid used in the acidification step should be sufficient to react with all of the color base in the organic solution or just slightly less than that amount. Any color base remaining in the organic solvent will not be lost since the solvent is recycled for another extraction. Excess acid should be avoided, particularly for the dye salts which are completely water soluble.

One of the most important applications of our new process is in the isolation of cationic dyes of the Malachite Green type from their preparative mixtures. These diamino derivatives of triphenylmethane are prepared by the condensation of two moles of N,N-dimethylaniline or N,N-diethylaniline with one mole of benzaldehyde, followed by chemical oxidation to the dye.

A specific example of the preparation of Malachite Green by this process is given on pages 299–301 of "Fundamental Processes of Dye Chemistry" by Fierz-David and Blangey (Interscience Publishers, 1949). In this example the leuco base, which is 4,4'-benzylidenebis (N,N-dimethylaniline), is oxidized by lead dioxide in the presence of hydrochloric acid to give the dye. This is isolated from the reaction mixture by converting the lead to lead sulfate which is filtered off and by treating the filtrate which contains Malachite Green chloride in solution wich caustic. The dye is thereby converted to its carbinol form which is water insoluble and precipitates. After filtering off the precipitated color base and washing it, it is reacidified with oxalic acid to form the easily crystallizable oxalate. A closely analogous dye, Brilliant Green (Color Index No. 42,040), is usually prepared in similar fashion but is commonly reacidified with sulfuric acid to give the sulfate.

This well known method of isolating Malachite Green and similar dyes from their preparative reaction mixtures involves several steps and recoveries, each of which presents an opportunity for loss of yield, requires time and raw materials, and generates additional effluent.

The usual method of isolating Malachite Green as the oxalate contains the step of dissolving the unpurified color base in strong aqueous oxalic acid. This has the disadvantage that the impurities are also carried into solution. Fractional crystallization is then necessary in order to obtain pure crystals of Malachite Green oxalate. This can leave large amounts of dye in the mother liquor which then require troublesome and expensive reqorking for recovery.

The recovery is accomplished by adding caustic to the mother liquors to precipitate the carbinol form. However, this basification is accompanied by considerable decomposition of the carbinol color base and consequent yield loss. There is no recovery in the new process of the present invention since solvent extraction removes all color base and essentially a dye-free effluent is obtained.

In practicing the present invention the above-described procedure may be used up to and including the filtration for the removal of lead sulfate. The aqueous filtrate is then treated by adding a quantity of a nonpolar organic solvent, such as benzene or toluene, sufficient to dissolve all of the Malachite Green type color base; quantities sufficient for this purpose are sometimes hereinafter called solvent quantities. An alkali metal hydroxide such as sodium hydroxide is then added in an amount sufficient to convert all of the Malachite Green salt into Malachite Green color base; preferably a 20 percent excess over this amount is used. The mixture is then agitated until all of the dye base has been liberated from its salt and extracted into the organic solvent, after which the organic solvent layer is separated and acidified as described above.

This extraction procedure involves fewer steps than the customary isolation procedures, thereby saving time and labor. At the same time, yield and purity of the Malachite Green dye are increased; also effluent volumes are lowered and effluent purity is improved. Raw material usage is also lowered by the extraction procedure of this invention.

The process of this invention is not limited to the extraction of Malachite Green and other similar cationic dyes from their preparative reaction mixtures. It can be used to treat any aqueous solutions of these dyes. Among its applications, the process provides an easy method for converting a solution of the cationic dye containing inorganic salts to one that is salt-free or for converting a solution of the dye to one of higher concentration.

The method of isolating cationic dyes of the Malachite Green type used in this invention differs from much of the prior art in that a precipitation step is avoided and in that the dye is extracted directly from its solution as the color base. Basing out of the color base and solution of the color base take place simultaneously, and a solid form of the color base is never actually present. Another advantage of this process lies in the fact that the dyes so isolated are of such purity that no further purification is necessary; the recoveries and effluents associated with purification are thereby avoided. The process is also useful in that it provides an easy method for the preparation of a variety of salts of a given dye directly from the extracted color base; these salts are usually of such purity that they can be spray-dried or drum-dried directly where desired.

The invention will be further described and illustrated by the following specific examples, wherein the amounts given are parts by weight unless otherwise indicated.

EXAMPLE 1

Extraction of Malachite Green

A clarified solution of Malachite Green chloride, constituting 2,546 parts by weight and containing 1,370 parts of Malachite Green chloride, is charged to a vessel containing 7,430 parts of toluene. The mixture is stirred while 300 parts of 50 percent aqueous caustic soda are added. Stirring is then continued for 30 minutes at ambient temperature. The mixture is allowed to settle for one hour after which the lower aqueous layer is drawn off and discarded, and the toluene layer is removed for further treatment.

The toluene solution of Malachite Green base so prepared is heated to 50°C. while stirring. It is then treated with 2,209 parts of aqueous oxalic acid, previously heated to 50°C. and containing 1,470 parts water and 739 parts oxalic acid dihydrate. After stirring the mixture for 30 minutes, it is allowed to settle for one hour. The lower, aqueous layer is drawn off to a crystallizer where the temperature is lowered to permit crystallization of the Malachite Green oxalate. After crystallization is complete, the dye crystals are filtered off and dried. The filtrate, which contains about 10 percent dye, is recycled by adding fresh oxalic acid and water in the correct proportions to give the aqueous oxalic acid solution used in the acidification step. All of the color base available in the organic solvent solution is precipitated as the oxalate in subsequent batches. The toluene is recycled for another extraction.

EXAMPLE 2

Preparation of Malachite Green Sulfate

The toluene solution of Malachite Green base as prepared in Example 1 is stirred while 1,896 parts of aqueous sulfuric acid containing 1,530 parts water to 366 parts $H_2SO_4$ are added. The resulting mixture is stirred at ambient temperature or 30 minutes and then allowed to settle for one hour. The lower aqueous layer is run to another vessel from which it is either drummed up for liquid type or spray dried for powdered type. The toluene is recycled for another extraction.

EXAMPLE 3

Extraction of Brilliant Green 1,175 parts of clarified Brilliant Green solution containing 35 parts Brilliant Green chloride is charged to a tank containing 199 parts toluene. While the mixture is stirred, 35 parts of 50 percent aqueous caustic soda are slowly added over about 15 minutes. The resulting mixture is stirred for 30 minutes and then allowed to settle for one hour. The lower aqueous layer is discarded. Seventy parts water and 9 parts 98 percent sulfuric acid are added to the stirred toluene layer, the resulting mixture is heated to 78°C., stirred 15 minutes and then allowed to settle for 30 minutes. The aqueous layer is separated and can be drummed as a liquid type, spray dried to give a powdered type, or treated with sodium sulfate to crystallize out Brilliant Green sulfate. The toluene is recycled for another extraction.

EXAMPLE 4

Extraction of Crystal Violet

Basic triarylmethane dyes of the Crystal Violet series are frequently made by the phosgene synthesis, wherein two moles of an N,N-dialkylarylamine are first condensed with one mole of phosgene in the presence of zinc chloride to form a diarylketone. This reacts further with phosgene to form an addition product, which condenses with a third mole of N,N-dialkylarylamine in the presence of aqueous hydrochloric acid to form the dye.

This series of reaction steps is carried out without isolating any of the intermediate reaction products, and the dye is therefore obtained as an aqueous solution containing inorganic salts and other impurities. The dye can be recovered in a purified condition, however, by applying the principles of the present invention.

Crystal Violet is obtained when three moles of N,N-dimethylaniline are reacted in this process. It is purified by the following procedure.

1,900 parts by weight of crude reaction product containing 100 parts of Crystal Violet dye as its chloride are charged to a vessel equipped with an agitator and 600 parts of toluene are added. The mixture is stirred vigorously while sufficient 50 percent sodium hydroxide solution is added to make the batch strongly alkaline; usually about 100 parts are sufficient. Stirring is continued for an additional 30 minutes after which the batch is allowed to settle until it has separated into layers. The lower aqueous layer is drawn off and discarded.

The toluene layer, which contains the Crystal Violet in the form of its color base, is treated with a quantity of dilute aqueous hydrochloric acid sufficient to convert the Crystal Violet into its chloride. This is most conveniently done by analyzing a sample of the toluene solution and adding the calculated amount of acid to the remainder with continuous agitation. After stirring for an additional one-half hour the batch is allowed to settle. The lower aqueous layer, which contains the dye, is drawn off and treated to separate the dye as by spray drying or concentration and crystallization.

The same procedure is applicable to any of the other basic triamino derivatives of triphenylmethane. It is also applicable to the corresponding diphenylnaphthylmethane dyes, such as Victoria Blue B, Victoria Blue R and Victoria Pure Blue BO.

EXAMPLE 5

Isolation of Methyl Violet as a Paste From a Preparative Reaction Mixture

A preparative reaction mixture is made by following the procedure described in U.S. Pat. No. 2,816,900 to the point where the oxidation reaction is substantially complete. Two hundred and forty parts of a Methyl Violet oxidation-condensation mixture, with the Methyl Violet in the form of a copper complex, is prepared in this manner.

This copper complex is filtered, the filtrate discarded, and the solids, about 92 parts, added to a stirred mixture of 800 parts chlorobenzene and 300 parts water. After addition of 50 parts of 24 percent aqueous caustic, the mixture is stirred and heated at 65°C. for about 3 hours. The hot mixture is then filtered with the solids being washed with 50 parts chlorobenzene followed by 50 parts water. The washes can be either added to the filtrate or held for use in the next extraction. The solid, consisting mainly of copper hydroxide may be converted separately to copper sulfate for use in the preparation reaction.

The two phase filtrate is allowed to settle. The chlorobenzene layer is then drawn off, the aqueous layer being discarded. The chlorobenzene layer is stirred and heated to 75°C. 64.5 parts of 8.5 percent aqueous hydrochloric acid is slowly added, the mixture stirred for 15 minutes, and the final mixture allowed to settle. Methyl Violet paste is drawn off, and the chlorobenzene can be recycled directly to another extraction. The dye paste may be treated to give liquid, powder, crystalline or base types by standard procedures.

The isolation of Methyl Violet dyes by this procedure is not claimed specifically in this application since it is described and claimed in our copending application Ser. No. 4,414 filed concurrently herewith.

What we claim is:

1. A method for recovering a purified basic triarylmethane dye from an aqueous dispersion of the salt form thereof which comprises adding to said dispersion a quantity of an inorganic base sufficient to convert all of said dye into its color base form and also adding, in solvent quantities, a nonpolar water-immiscible organic solvent for said color base in which the dye in its salt form is insoluble, reacting the dye with the inorganic base in the presence of said organic solvent and thereby extracting the dye base into the solvent as it is formed, separating the resulting dye base solution from the aqueous phase, and recovering a purified triarylmethane dye therefrom by reacting the dye base with an acid.

2. A method according to claim 1 in which the nonpolar solvent is a member of the group consisting of mononuclear aromatic hydrocarbons, chlorobenzene and carbon tetrachloride.

3. A method according to claim 1 in which the dye is a diphenylnaphthylmethane dye.

4. A method according to claim 1 in which the dye is a triphenylmethane dye.

5. A method for recovering a purified basic diaminotriphenylmethane dye from an aqueous solution of the salt form thereof which comprises adding to said solution a quantity of an inorganic base sufficient to convert all of said dye into its color base form and also adding, in solvent quantities, a nonpolar water-immiscible organic solvent for said color base in which the dye in its salt form is insoluble, reacting the dye with the inorganic base in the presence of said organic solvent and thereby extracting the dye base into the solvent as it is formed, separating the resulting dye base solution from the aqueous phase, and recovering a purified diaminodiphenylmethane dye therefrom by reacting the dye base with an acid.

6. A method according to claim 5 in which the nonpolar solvent is a member of the group consisting of mononuclear aromatic hydrocarbons, chlorobenzene and carbon tetrachloride.

7. A method according to claim 5 in which the dye is Brilliant Green.

8. A method according to claim 5 in which the dye is Malachite Green.

9. A method for recovering a purified Malachite Green from an aqueous solution of a Malachite Green salt which comprises adding to said solution a quantity of an inorganic base sufficient to convert all of said Malachite Green salt into Malachite Green color base and also adding, in solvent quantities, a nonpolar water-immersible solvent for said color base in which the Malachite Green salt is insoluble, said solvent being a member of the group consisting of mononuclear aromatic hydrocarbons, chlorobenzene and carbon tetrachloride, reacting the dye with the inorganic base in the presence of said solvent and thereby extracting the dye base into the solvent as it is formed, separating the resulting dye base solution from the aqueous phase, and recovering purified Malachite Green dye therefrom by reacting the dye base with an acid.

* * * * *